(12) United States Patent
Ittlinger et al.

(10) Patent No.: US 6,729,347 B2
(45) Date of Patent: May 4, 2004

(54) DEVICE FOR PRESSURE REGULATION

(75) Inventors: Ralph Ittlinger, Weissach (DE);
Wolfgang Bueser, Freiberg (DE);
Lorenz Drutu, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 09/979,140

(22) PCT Filed: Mar. 16, 2001

(86) PCT No.: PCT/DE01/01019
§ 371 (c)(1),
(2), (4) Date: May 13, 2002

(87) PCT Pub. No.: WO01/69112
PCT Pub. Date: Sep. 20, 2001

(65) Prior Publication Data
US 2002/0148508 A1 Oct. 17, 2002

(30) Foreign Application Priority Data
Mar. 17, 2000 (DE) .......................................... 100 13 448

(51) Int. Cl.⁷ ............................................... F16K 15/02
(52) U.S. Cl. .................. 137/540; 137/538; 137/543.23; 251/337
(58) Field of Search ................. 137/538, 540, 137/543.21, 543.23; 251/337

(56) References Cited

U.S. PATENT DOCUMENTS

| | | | | |
|---|---|---|---|---|
| 122,756 A | * | 1/1872 | Camerer | 137/540 |
| 2,594,405 A | * | 4/1952 | Deters | 251/337 |
| 3,244,195 A | * | 4/1966 | Wanner | 251/337 |
| 3,422,840 A | * | 1/1969 | Bryant et al. | 137/540 |
| 3,903,923 A | * | 9/1975 | Loup et al. | 137/543.23 |
| 4,637,430 A | * | 1/1987 | Scheffel et al. | 137/543.21 |
| 4,821,954 A | * | 4/1989 | Bowder | 251/337 |
| 5,139,047 A | * | 8/1992 | Reinicke | 137/543.21 |
| 5,332,000 A | * | 7/1994 | Gassner | 137/543.23 |
| 5,606,991 A | * | 3/1997 | Kuribayashi | 251/337 |
| 5,803,433 A | * | 9/1998 | Brocard et al. | 251/337 |
| 6,029,694 A | * | 2/2000 | Schwegler et al. | 137/510 |

FOREIGN PATENT DOCUMENTS

DE  644006 C  * 4/1937

* cited by examiner

Primary Examiner—John Rivell
(74) Attorney, Agent, or Firm—Ronald E. Greigg

(57) ABSTRACT

The invention relates to a device (10) for pressure regulation, having a housing (11) and a closing body (12) received axially movably therein, wherein the housing (11) has at least one pressure medium inlet (21) and one pressure medium outlet (22), and the closing body (12) is prestressed by a helical spring (14) against a valve seat (11') in the housing, and at least one compensation means for the helical spring (14) is provided. The invention provides that as the compensation means, a compensation element (15) disposed between the closing body (12) and an end, oriented toward the closing body (12), of the helical spring (14) is provided, which is braced resiliently in the radial direction on the inner wall of the housing (11) and, with its central region (15'), is in preferably frictional-engagement contact with the closing body (12). The central region (15') of the compensation element (15) is embodied as dome-shaped, and radially protruding spring arms (15") are disposed peripherally to the central region (15') of the compensation element (15).

18 Claims, 5 Drawing Sheets

DEVICE FOR PRESSURE REGULATION

CROSS-REFERENCE TO RELATED APPLICATIONS

This application is a 35 USC 371 application of PCT/DE 01/01019 filed on Mar. 16, 2001.

BACKGROUND OF THE INVENTION

1. Field of the Invention

The invention is directed to an improved device for pressure regulation of the type in which a closing body is prestressed against a valve seat by a helical spring.

2. Description of the Prior Art

In devices of the type with which this invention is concerned, an axially movable closing body is prestressed against an associated valve seat by means of a helical spring disposed coaxially to the closing body.

In devices of this generic type, an axially movable closing body is prestressed against the associated valve seat by means of a helical spring disposed coaxially to the closing body. Because of the instability of helical springs in the transverse direction, a compensation means is necessary to compensate for a resultant skewed spring position, since otherwise an uncontrolled lateral tilting behavior of the adjacently disposed closing body would occur, which would lead to an undefined response performance of the device.

From British Patent Disclosure GB 14 63 217, one such device is already known. In it, a compensation means is disposed axially between the closing body and the associated valve seat, in order to compensate for a skewed position of the helical spring and a resultant tendency to transverse tilting of the closing body. However, what is unsatisfactory in this prior art is that a positive-engagement contact between the compensation means and the closing body is necessary, which requires precision-fitted and therefore expensive production. Since furthermore the compensation means is in permanent engagement with the valve seat associated with the closing body, the flow resistance at the valve seat is undesirably increased in the open position of the closing body.

SUMMARY OF THE INVENTION

The device of the invention has the advantage over the prior art that because of the bracing, provided in the radial direction, of the compensation means on the inner wall of the housing, the radial force components generated by the helical spring under initial tension, are absorbed and compensated for, so that only the components generated in the axial direction by the helical spring are carried onward by the compensation means. Because of the disposition of the compensation means between the helical spring and the closing body, the flow resistance at the valve seat furthermore remains essentially unaffected.

BRIEF DESCRIPTION OF THE DRAWINGS

The foregoing features and advantages of the invention will become apparent from the detailed description contained below, taken with the drawings, in which.

DESCRIPTION OF THE PREFERRED EMBODIMENTS

Figure 1:
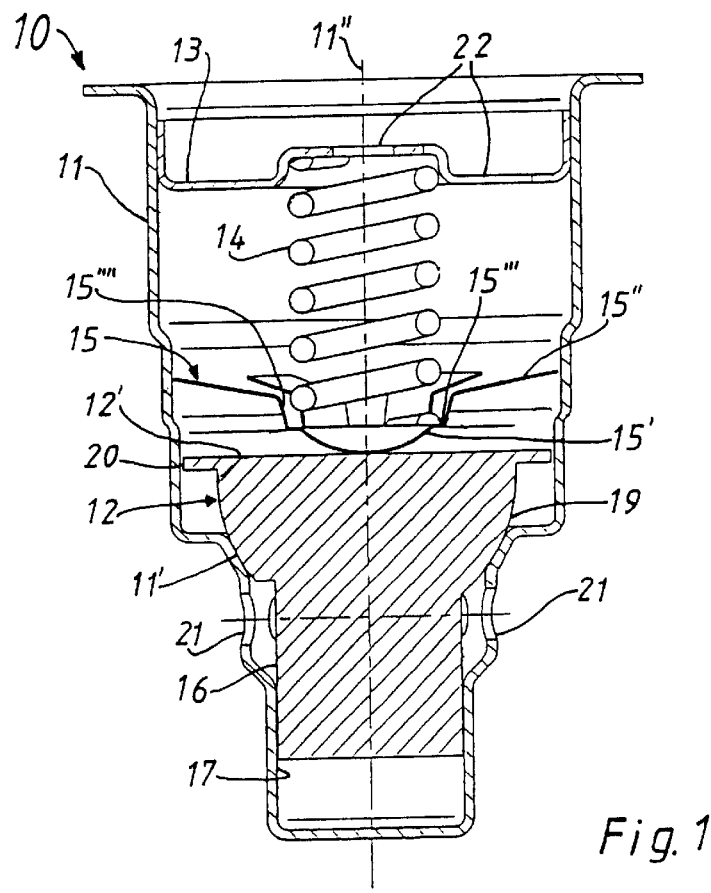
FIG. 1 shows a view in longitudinal section of a device according to the invention, which includes a housing with a closing body received in it; a helical spring with a compensation element is disposed between the closing body and one part of the housing.

The device indicated in its entirety by reference numeral 10 in FIG. 1 has a housing 11, in which a closing body 12 is received that is supported on a lower, narrowed-diameter region 11' of the housing 11 embodied as a valve seat and is axially movable along the longitudinal axis 11" of the housing 11. In the axial direction, a helical spring 14 is disposed between the closing body 12 and a housing part 13, embodied as a closure cap in the upper region of the housing 11; the upper end of the helical spring is seated within a central bulge in the closure cap 13, and its opposite lower end is supported on a compensation element 15, which with its central region 15' acts upon the closing body 12. To that end, the central region 15' of the compensation element 15 is pre-curved in dome-shaped fashion in the direction of the adjacent closing body 12; that is, the central region 15' has the approximate shape of a segment of a spherical shell, whose concave side faces toward the helical spring 14; spring arms 15" of the compensation element 12 that protrude radially from the central region 15' are braced resiliently with their ends on the inner wall of the housing 11, so that as a result, the compensation element 15 is under transverse initial tension. A radially encompassing annular transitional portion 15'" between the dome-shaped region 15' of the compensation element 15 and the spring arms 15" that protrude radially from the latter serves as what in the installed position is a plane bearing face for the associated end of the helical spring 14; the diameter of the annular transitional portion 15'" is adapted to the diameter of the helical spring 14. The compensation element 15 is in frictional-engagement contact, for instance, with the closing body 12, since the apex as an extreme point of the dome-shaped region 15' acts upon the bearing face 12', facing toward it, of the closing body 12, specifically approximately centrally in the longitudinal axis 11" of the housing 11. The closing body 12 is embodied cylindrically in its lower region 16, and this region 16 is guided in a receiving bore 17 of the housing 11 that has a diameter corresponding to it. While the housing 11 is widened in diameter in stages upward in the axial direction from its bottom region 17, the cylindrical region 16 of the closing body 12 is adjoined at the top by a sealing portion 19 in the form of a spherical segment associated with the valve seat 11', and this portion ends at a radially outward-protruding collar 20. Extending between the bottom region 17 of the housing 11 and the portion of the housing 11 that is embodied as the valve seat 11' is a transitional portion, which has a larger diameter than the associated cylindrical region 16 of the closing body 12 and that has inlet openings 21 disposed transversely to the longitudinal axis 11" of the housing 11; a hollow chamber approximately in the form of an annular gap extends between the wall of the transitional portion and the adjacent cylindrical region 16 of the closing body 12. Outlet openings 22 are provided in the housing part 13 that closes off the housing 11 at the top. Since the closing body 12 with its spherical-layered sealing portion 19 is seated on the associated valve seat 11', the device 10 is in the closed valve function position in FIG. 1.

Figure 2:
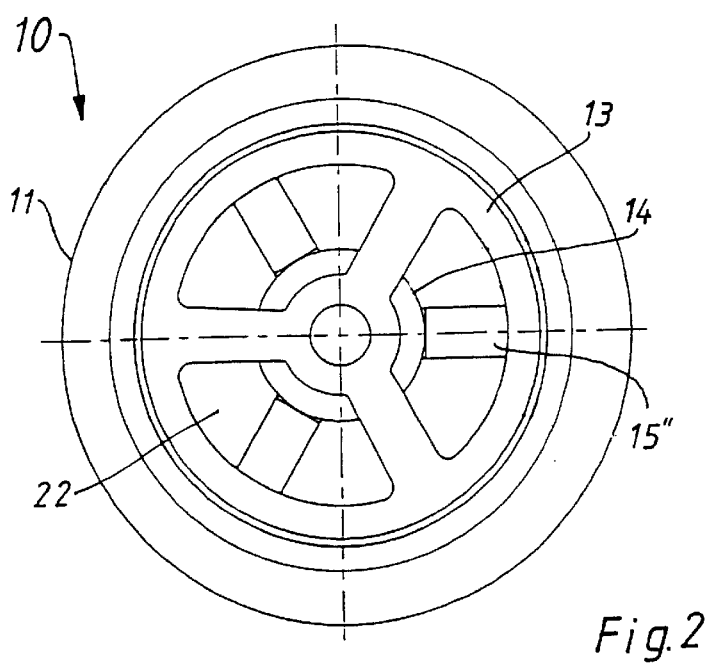
FIG. 2 shows the device of FIG. 1 in a plan view.

FIG. 2 on the one hand shows the location of the closure cap 13 and on the other the geometric disposition of the spring arms 15", belonging to the compensation element 15, inside the housing 11 of the device 10. To that end, the closure cap 13 is inserted into the upper region of the housing 11, and a radially encompassing, upward-protruding rim rests on the associated inner wall of the housing 11. The closure cap 13 has, coaxially to the longitudinal axis 11" of the housing 11, a central outlet opening 22 and three recesses, spaced apart from one another in the circumferential direction, as outlet openings 22, with spokelike struts located between them. For this purpose, the compensation element 15 likewise braced on the inner wall of the housing 11 has the spring arms 15", which are spaced apart uniformly in the circumferential direction.

Figure 3:
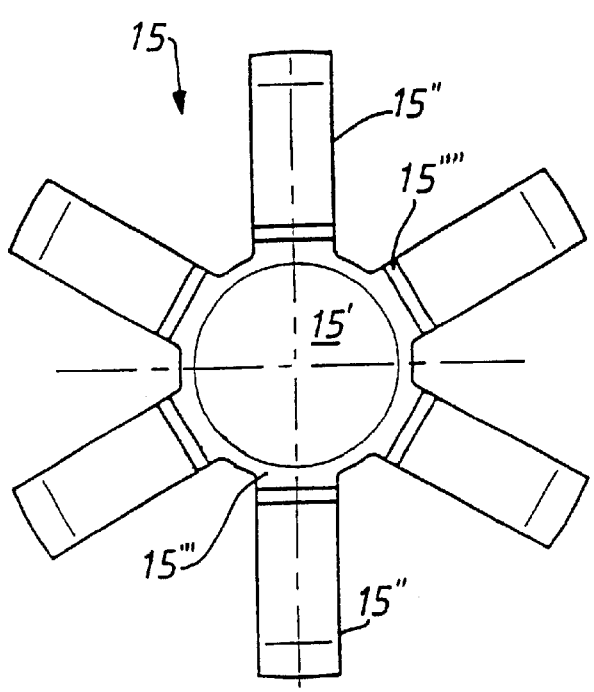
FIG. 3 is a plan view showing the compensation element employed in the device.
Figure 4:
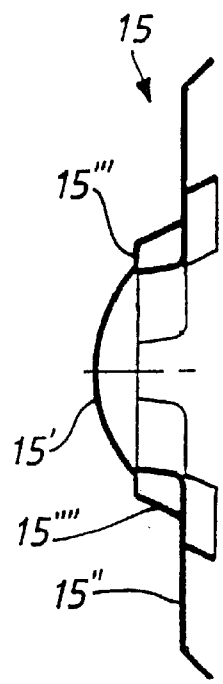
FIG. 4 shows a cross section through the compensation element of FIG. 3.

As FIG. 3 shows, the spring arms 15" protruding radially from the dome-shaped region 15' of the compensation element 15 for bracing purposes on the inner wall of the housing 11 are spaced apart uniformly in the circumferential direction; in the exemplary embodiment, this creates six spring arms, and thus the compensation element 15 has a sextuple symmetry. Also in the exemplary embodiment, the compensation element 15 is shaped from a leaflike steel sheet. From FIG. 4 it can be seen that the dome-shaped region 15' has a substantially spherical curvature, thus resulting in a spherical shell segment. The dome-shaped region 15' is bounded by the annular transitional portion 15''', and between the circumference thereof and the respectively pivotably connected spring arm 15", there is in each case a short, stepped shoulder 15"", extending upward, obliquely to the axial direction, and disposed radially; the shoulder serves as a lateral stop for the movable end of the helical spring 14. The spring arms 15" thus pivotably connected to the central region 15' via the transitional portion 15''' and the respective shoulder 15"" protrude radially outward approximately perpendicular to the respectively associated shoulder 15"" and are arranged approximately in the shape of a star; in a variant embodiment, their ends are angled upward somewhat. In the non-installed state of the compensation element 15, the spring arms 15" are embodied as straight.

Figure 5:
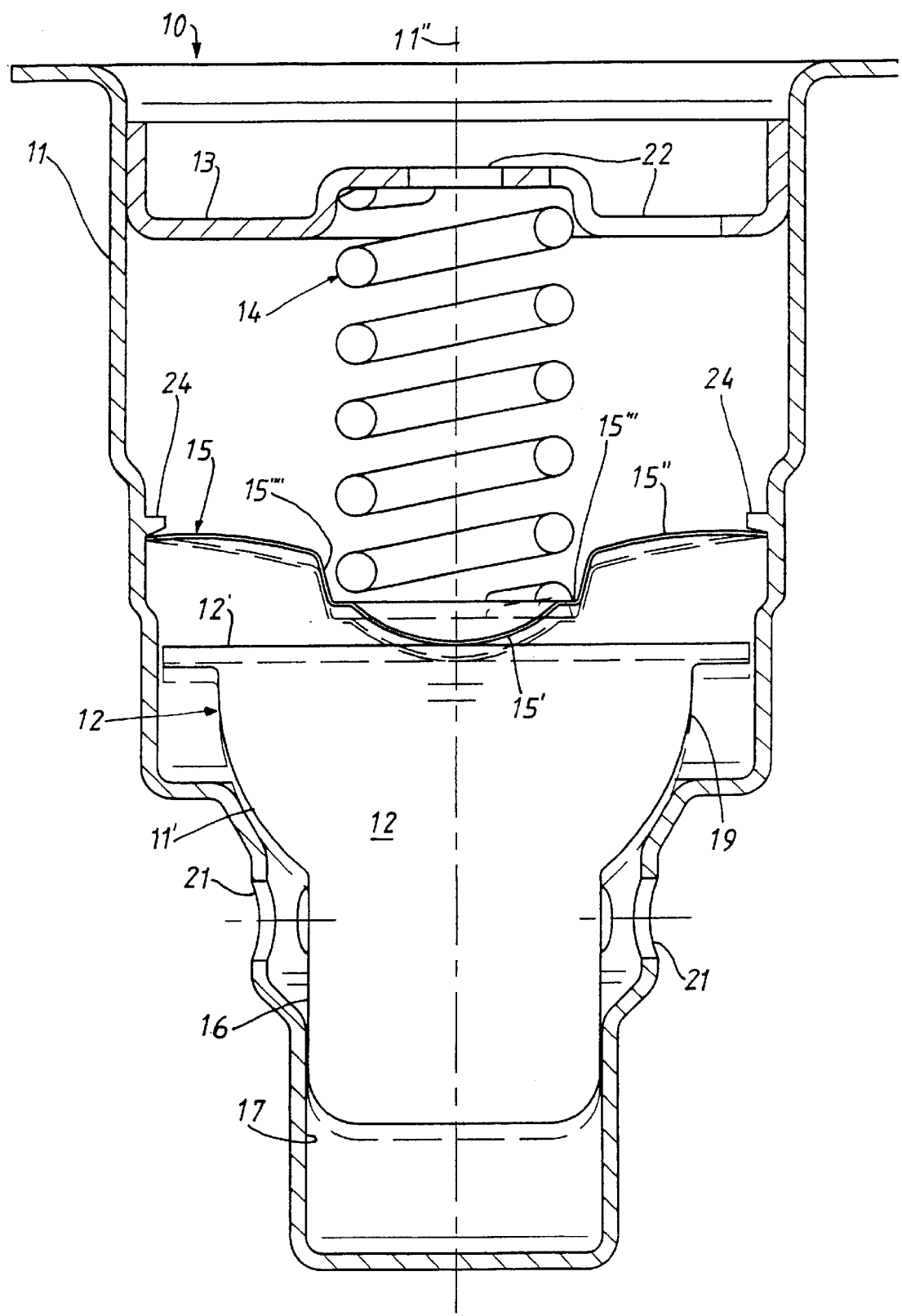
FIG. 5 is a longitudinal section of a second embodiment of the device of the invention; dashed lines for the closing body and the compensation element represent a closed valve function, while the solid lines represent an opened valve function, in which the closing body is axially deflected out of its valve seat.

FIG. 5 shows the mode of operation of the device 10 of the invention in terms of a second embodiment, which differs from the first embodiment of FIGS. 1–4 in that the inner wall of the housing 11, at the level of the spring arms 15" of the compensation element 15 that engage it there, has a radially inward-protruding encompassing stop collar 24, on which the spring arms 15" come to rest. If the pressure introduced via the inlet openings 21 exceeds the counterpressure exerted on the closing body 12 by the helical spring 14, then the closing body 12 is deflected axially upward with simultaneous compression of the helical spring 14, and a flow conduit extends upward from the inlet openings 21, through the annular-gaplike hollow chamber and past the spherical sealing portion 19 with the adjoining collar 20 to reach the outlet openings 22 provided in the closure cap 13. This open valve function of the device 10 is shown by the solid lines for the axially displaceable closing body 12 and the compensation element 15 in FIG. 5, while by comparison the broken lines show the closed valve function. As FIG. 5 also shows, in the open valve function the axial deflection of the closing body 12, via the frictionally engaged connection with the dome-shaped region 15' of the compensation means 15, leads to a slight isotropic bending of the spring arms 15" braced on the inner wall of the housing.

Figure 6:
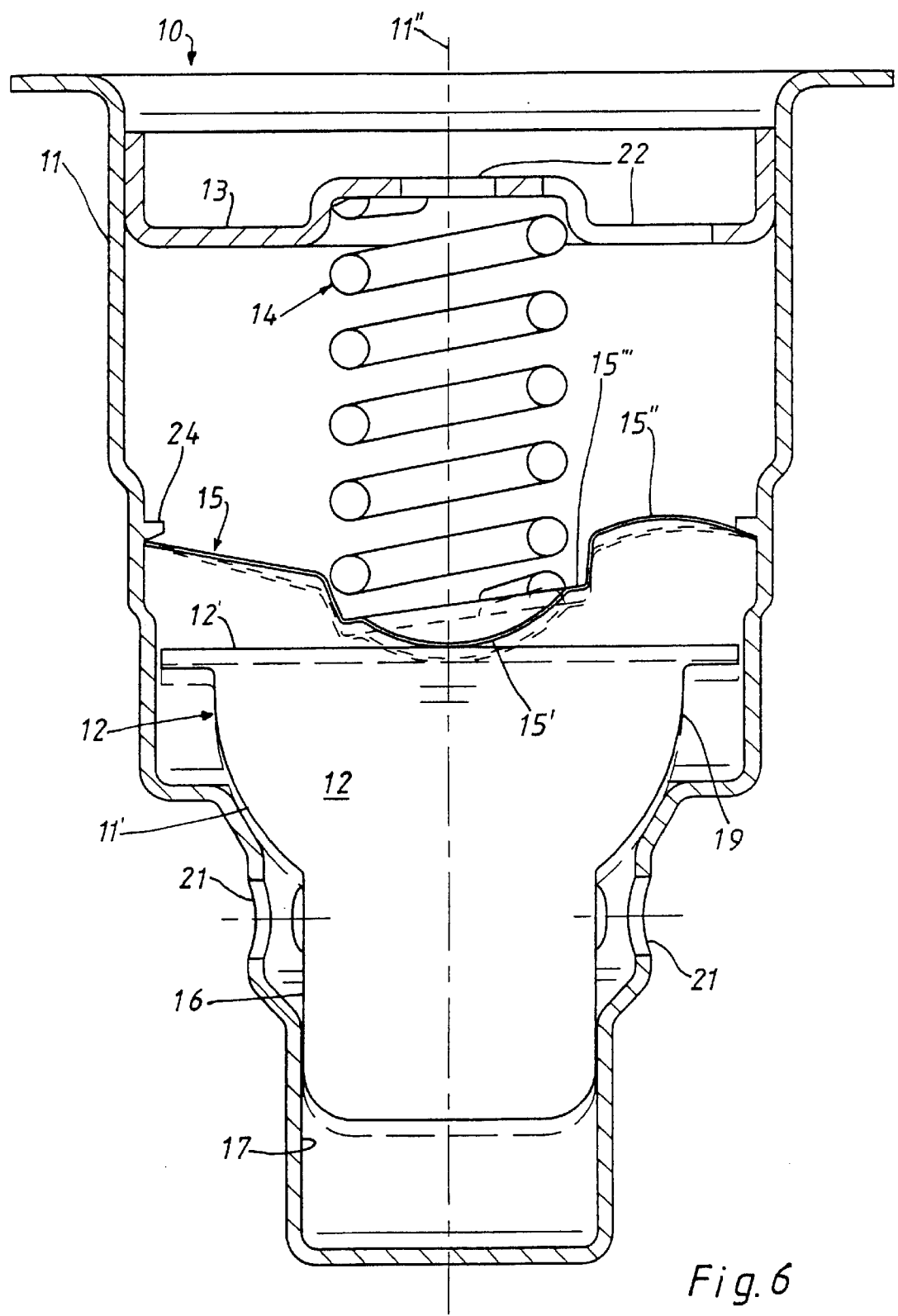
FIG. 6 is a longitudinal section of the compensation for an incident skewed spring position of the helical spring by bending of the compensation element.

FIG. 6 illustrates the mode of operation of the compensation means 15 in the event of a skewed position of the helical spring 14. As the respective dashed and solid lines for the closing body 12 and the compensation element 15 in FIG. 6 show, this skewed position exists both in the closed and open position of the device 10. As a result, the movable end, toward the closing body 12, of the helical spring 14 exerts not only an axial force but also a force component in the radical direction. Since the movable end of the helical spring 14 acts upon the annular region 15''' of the compensation element 15, this skewed position causes torque bias of the dome-shaped region 15', and the transverse and radial force component is absorbed by the laterally protruding spring arms 15" braced on the inner wall of the housing 11; as a result, the spring arms 15" oriented in the direction of the transverse torque bias become bent to a greater extent than the other spring arms 15". The skewed state of the movable end of the helical spring 14 is thus compensated for by way of the dome-shaped region 15' of the compensation element 15. The radius of curvature of the dome-shaped region 15' is selected such that the pivot point is located in the plane of the spring arms 15", and a relative motion of the engagement point, located at the apex of the dome-shaped region 15', between the compensation element 15 and the adjacent closing body 12 is thus maximally precluded, so that the contact point, defined by the apex of the dome-shaped region 15', between the compensation element 15 and the adjacent bearing face 12' of the closing body 12 is centered in the longitudinal axis 11". The compressive force of the helical spring 14 is thus carried on axially, that is, without radial offset, to the closing body 12. The compensation element 15 thus acts as a transverse force securing means, so that the closing body 12 is acted upon only in the axial direction and only centrally in the longitudinal axis 11", independently of radial transverse forces.

Figure 7:
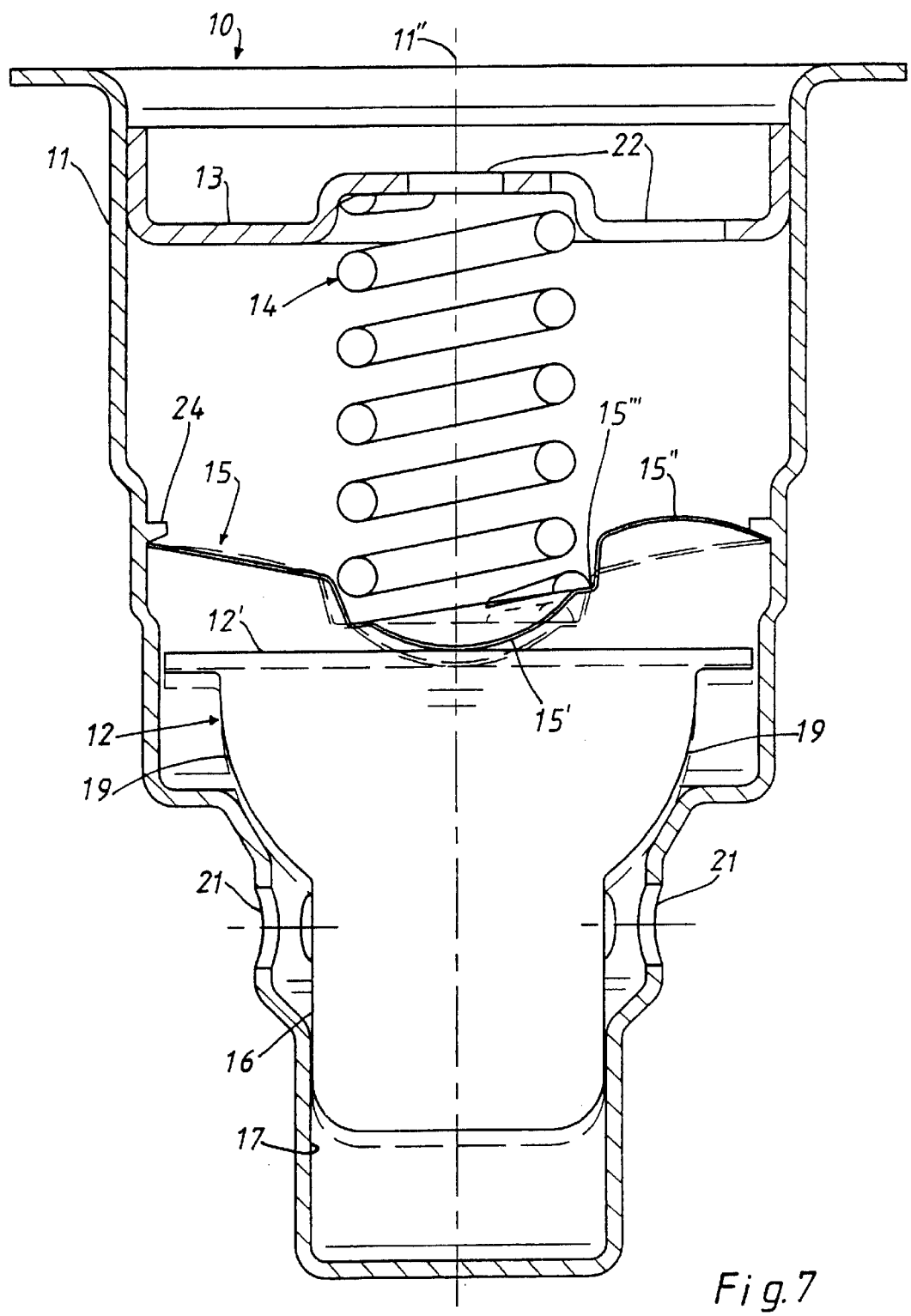
FIG. 7 is a longitudinal section of the compensation for an even greater skewed spring position by corresponding bending of the compensation element.

FIG. 7 illustrates the mode of operation of the compensation element 15 in the event of an even more-pronounced skewed position of the helical spring 14 in the open position of the device 10. While in the closed position, as the dashed lines show, the helical spring 14 acts upon the compensation element 15 concentrically to the longitudinal axis 11", that is, without a skewed state, and the spring arms braced radially on the inner wall of the housing 11 are oriented isotropically, in the open position as shown by the solid lines, an eccentric displacement of the movable end of the helical spring 14 occurs relative to the longitudinal axis 11". This in turn leads to a corresponding torque bias of the dome-shaped region 15', and the spring arms 15" oriented in the direction of the torque bias bend in accordance with the amount of torque bias, while the spring arms 15" that are oriented away from the direction of the torque bias are virtually unaffected, thus resulting in an anisotropic response behavior of the spring arms 15". Because of the embodiment of the compensation element 15, a greater skewed spring position can thus be compensated for, so that with the device 10 of the invention, even helical springs with a major skewed position can be used.

The foregoing relates to preferred exemplary embodiments of the invention, it being understood that other variants and embodiments thereof are possible within the spirit and scope of the invention, the latter being defined by the appended claims.

We claim:

1. A device for pressure regulation comprising a housing and a closing body received axially movably therein, said housing having at least one pressure medium inlet and one pressure medium outlet, and said closing body being prestressed by a helical spring against a valve seat in the housing, at least one compensation element (15) for the helical spring being disposed between the closing body (12) and an end, oriented toward said closing body (12), of the helical spring (14), said compensation element being braced resiliently in the radial direction on the inner wall of said housing (11) and, with its central region (15'), forms a contact with the closing body (12), wherein further the central region (15') of the compensation element (15) is embodied as dome-shaped, and the apex, as an extreme point of the region (15') forms a contact with the adjacent closing body (12).

2. The device of claim 1, wherein said formed contact (between 15' and 12) is a frictional-engagement contact.

3. The device of claim 1, further comprising radially protruding spring arms (15") disposed peripherally to the central region (15') of said compensation element (15).

4. The device of claim 2, further comprising radially protruding spring arms (15") disposed peripherally to the central region (15') of said compensation element (15).

5. The device of claim 3, wherein a radius of curvature of the dome-shaped region (15') of said compensation element (15) is dimensioned such that a pivot point is located approximately in a plane defined by said spring arms (15").

6. The device of claim 4, wherein radius of curvature of the dome-shaped region (15') of said compensation element (15) is dimensioned such that pivot point is located approximately in a plane defined by said spring arms (15").

7. The device of claim 1, wherein the radial length of said compensation element (15) is dimensioned in accordance with the radial inside diameter of an associated cylindrical jacket portion of said housing (11).

8. The device of claim 4, wherein the radial length of said compensation element (15) is dimensioned in accordance with an radial inside diameter of the associated cylindrical jacket portion of said housing (11).

9. The device of claim 2, wherein the diameter of the dome-shaped region (15') is approximately equivalent to the diameter of the helical spring (14).

10. The device of claim 6, wherein the diameter of the dome-shaped region (15') is approximately equivalent to the diameter of the helical spring (14).

11. The device of claim 1, wherein said compensation element (15) has a transitional portion (15'''), annularly surrounding said dome-shaped region (15') radially, in the form of a plane bearing face for the end of said helical spring (14) oriented toward said compensation element (15), and a stepped shoulder (15'''') extending approximately axially in the direction of said helical spring (14) is disposed between the circumference of the transitional portion (15''') and respective pivotably connected spring arm (15").

12. The device of claim 5, wherein said compensation element (15) has a transitional portion (15'''), annularly surrounding said dome-shaped region (15') radially, in the form of a plane bearing face for the end of said helical spring (14) oriented toward said compensation element (15), and a stepped shoulder (15'''') extending approximately axially in the direction of said helical spring (14) is disposed between the circumference of the transitional portion (15''') and the respective pivotably connected spring arm (15").

13. The device of claim 7, wherein said compensation element (15) has a transitional portion (15'''), annularly surrounding said dome-shaped region (15') radially, in the form of a plane bearing face for the end of said helical spring (14) oriented toward said compensation element (15), and a stepped shoulder (15'''') extending approximately axially in the direction of said helical spring (14) is disposed between the circumference of the transitional portion (15''') and respective pivotably connected spring arm (15").

14. The device of claim 3, further comprising a stop collar (24) for the spring arms (15") that protrudes radially inward and extends all the way around is provided on the inner wall, associated with said compensation element (15), of the corresponding cylindrical jacket portion of the housing (11).

15. The device of claim 5, further comprising a stop collar (24) for the spring arms (15") that protrudes radially inward and extends all the way around is provided on the inner wall, associated with said compensation element (15), of a corresponding cylindrical jacket portion of the housing (11).

16. The device of claim 7, further comprising a stop collar (24) for the spring arms (15") that protrudes radially inward and extends all the way around is provided on the inner wall, associated with said compensation element (15), of a corresponding cylindrical jacket portion of the housing (11).

17. The device of claim 3, wherein said compensation element (15) has six spring arms distributed uniformly in the circumferential direction.

18. The device of claim 1, wherein said compensation element (15) is embodied integrally.

* * * * *